United States Patent

Landgraf et al.

[11] Patent Number: 6,154,633
[45] Date of Patent: Nov. 28, 2000

[54] METHOD AND APPARATUS FOR UPGRADING FEATURES AND FUNCTIONS OF A SET TOP BOX IN THE FIELD

[75] Inventors: Henry S. Landgraf, Cherry Hill, N.J.; Vijay K. Pola, Lansdale, Pa.

[73] Assignee: Motorola, Inc., Schaumburg, Ill.

[21] Appl. No.: 09/001,631

[22] Filed: Dec. 31, 1997

Related U.S. Application Data

[60] Provisional application No. 60/062,622, Oct. 22, 1997.

[51] Int. Cl.⁷ .............................. H04H 1/02; H04N 7/10
[52] U.S. Cl. ................................. 455/6.2; 348/10
[58] Field of Search ................. 348/6, 10, 11; 455/3.1, 4.1, 6.1, 6.2, 6.3

[56] References Cited

U.S. PATENT DOCUMENTS

| | | | |
|---|---|---|---|
| 4,696,034 | 9/1987 | Wiedemer | 380/16 |
| 5,003,591 | 3/1991 | Kauffman et al. | 380/10 |
| 5,367,571 | 11/1994 | Bowen et al. | 380/20 |
| 5,440,632 | 8/1995 | Bacon et al. | 380/20 |
| 5,483,277 | 1/1996 | Granger | 348/6 |
| 5,559,549 | 9/1996 | Hendricks et al. | 348/6 |
| 5,990,927 | 11/1999 | Hendricks et al. | 348/6 |

*Primary Examiner*—John W. Miller
*Attorney, Agent, or Firm*—Ronald P. Kananen; Rader, Fishman & Grauer

[57] ABSTRACT

A method and apparatus allow the function circuitry of a set top box to be readily upgraded or replaced in the field. Replacement or upgraded function circuitry is provided in a self-contained module. The set top box is provided with a port through which the module can be electrically connected to the set top box. Insertion of the module either bypasses existing function circuitry or is the only function circuitry available to the set top box.

13 Claims, 3 Drawing Sheets

METHOD AND APPARATUS FOR UPGRADING FEATURES AND FUNCTIONS OF A SET TOP BOX IN THE FIELD

This application claims the benefit for provisional application Ser. No. 60/062,622 filed Oct. 22, 1997.

FIELD OF THE INVENTION

The present invention relates to the upgrading of features and functions provided by a set top box in an audiovisual audio programming delivery system. More particularly, the present invention relates to a method and apparatus for rapidly upgrading a set top box by making the function circuit of the box modular or bypassed by a secondary module plugged into a port of the set top box.

BACKGROUND OF THE INVENTION

Private systems for delivering audiovisual programming to authorized subscribers are popular and widely used throughout the world. Cable television is a prime example of such a system. Additionally, a private system for delivering audiovisual programming to authorized subscribers may be a pay-per-view system in a residence or in a public establishment such as a hotel, or a communication system used by an organization, private or governmental, to provide audiovisual programming to members of the organization.

The basic premise of private systems for delivering audiovisual programming to authorized subscribers is that only authorized subscribers should be able to receive the programming. In the interests of security, privacy or to enable the provider to charge a fee for the programming, those who are not authorized subscribers must be prevented from receiving the programming.

The traditional, straightforward method of excluding unauthorized parties from accessing the transmitted audiovisual programming is for the programming provider to scramble or encode the signal carrying the programming prior to transmission. Authorized subscribers who have paid for the programming or who are cleared to receive the programming are provided with a descrambler or decoder unit which unscrambles or decodes a signal carrying the programming.

After the signal is unscrambled or decoded the programming can be properly perceived by the authorized subscriber. This decoder unit is referred to as a set top box, the set being the monitor, tuner or other device with which the transmitted programming is received. Unauthorized parties who do not have the set top box with be unable to receive the audiovisual programming in an intelligible form.

As used herein, "audiovisual programming" or "audiovisual signal" includes video and audio signals, whether transmitted alone or in combination as well as data, games (or other programs), graphics, control, telephony, text or other information independent of format. This programming may be transmitted from the programming provider to the authorized subscribers by wire or broadcast within the meaning of the present invention. As used herein, "set top box" is intended to broadly include satellite receivers, LMDS or MMDS or any IRD (integrated receiver/decoder).

A typical design for a set top box is illustrated in FIG. 1. As shown in FIG. 1, a conventional set top box 100 receives an input audiovisual signal through an input terminal 102. The signal received at input terminal 102 is provided to a standard function circuit 101.

The standard function circuit 101 contains the necessary circuitry, decryption keys, etc. to decode the audiovisual signal received through input terminal 102. Alternatively, the function circuit 101 may enhance the audiovisual signal. The standard function circuit 101 converts the input signal to a form in which it can be intelligently perceived when supplied to a monitor, tuner, television or other receiver device. The decoded signal is output by the standard function circuit 101 to an output terminal 103. The receiver device (not shown) is then connected to the output terminal 103.

The set top box 100 also includes a power controller 104 which receives power from a power input terminal 105. The power controller 104 provides power from the power input terminal 105 to the standard function circuit 101. In this manner, the set top box 100 allows the authorized subscriber who possess it to receive and use the transmitted audiovisual signal.

However, the set top box 100 and standard function circuit 101 may readily become obsolete for a variety of reasons. For example, in the interests of security, the method of encoding and decoding the audiovisual signal may be periodically changed by the signal provider. Similarly, the signal provider may simply upgrade the encoding system periodically to incorporate new features and functions. The service provider may also offer additional channels of audiovisual signals which are encoded using new or different methods. If the function circuit is enhancing the audiovisual signal, better methods of performing the enhancement may become available.

Additionally, the standard function circuit 101 may simply malfunction or become damaged. In any of these instances, the standard function circuit 101 will no longer allow the authorized subscriber to completely or optimally receive the audiovisual signals transmitted by the provider.

The solution to this problem in the past has been to provide authorized subscribers with a new set top box containing an updated standard function circuit. The updated function circuit is designed to fully receive and translate the signals transmitted by the signal provider.

However, this solution is obviously expensive and time consuming, especially if authorized subscribers are widely spread over a large geographic region. Thus, there is a need in the art for a method and apparatus of readily and inexpensively upgrading set top boxes in the field.

SUMMARY OF THE INVENTION

It is an object of the present invention to meet the above-described needs and others. Specifically, it is an object of the present invention to provide a method and apparatus for readily upgrading set top boxes in the field.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may include an upgradeable set top box having: an input terminal for inputting an audiovisual signal; an output terminal for outputting a processed audiovisual signal; and a port having a connector for receiving a function circuit module and connecting a function circuit of the module between the input terminal and the output terminal. The function circuit receives the audiovisual signal from the input terminal and outputs the processed audiovisual signal to the output terminal.

The set top box of the present invention may also incorporate a connection sensor for detecting whether a function circuit module is present in the port. A power controller may selectively provide power to the function circuit module present in the port as determined by the connection sensor. If a standard function circuit is already present in the set top box, the power controller ceases to provide power to the standard function circuit when a function circuit module is present in the port as determined by the connection sensor.

The present invention also encompasses the self-contained function circuit module which includes: a function circuit for receiving an audiovisual signal and outputting a processed audiovisual signal; and a connector for connecting the function circuit to a port of a set top box. The connector has connections for providing power and the audiovisual signal to the function circuit, and for outputting the processed audiovisual signal from the function circuit when the module is connected to the set top box.

The processed audiovisual signal output by the function circuit may be a decoded or an enhanced audiovisual signal.

The present invention also encompasses a method of upgrading or replacing a function circuit of a set top box. The method includes connecting a self-contained module having a function circuit therein in a port of the set top box so that the function circuit receives an input audiovisual signal through the port and outputs a processed audiovisual signal through the port.

Where a standard function circuit is already disposed in the set top box, the method will include bypassing the standard function circuit after the connection of the module is performed. The bypassing may include cutting power to the standard function circuit.

The method of the present invention may also include detecting connection of the module in the port and initiating the bypassing in response. Additionally, to signal the connection of the module, the method may include actuating a switch in performing the connecting to initiate the bypassing.

Finally, the method of the present invention may include decoding or enhancing the input audiovisual signal with the function circuit to generate the processed audiovisual signal.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

A basic premise of the present invention is to provide a function circuit for a set top box that is incorporated into a self-contained module which can be plugged into a set top box and thereby become the standard function circuit or bypass and replace a standard function circuit existing in the set top box.

Figure 1:
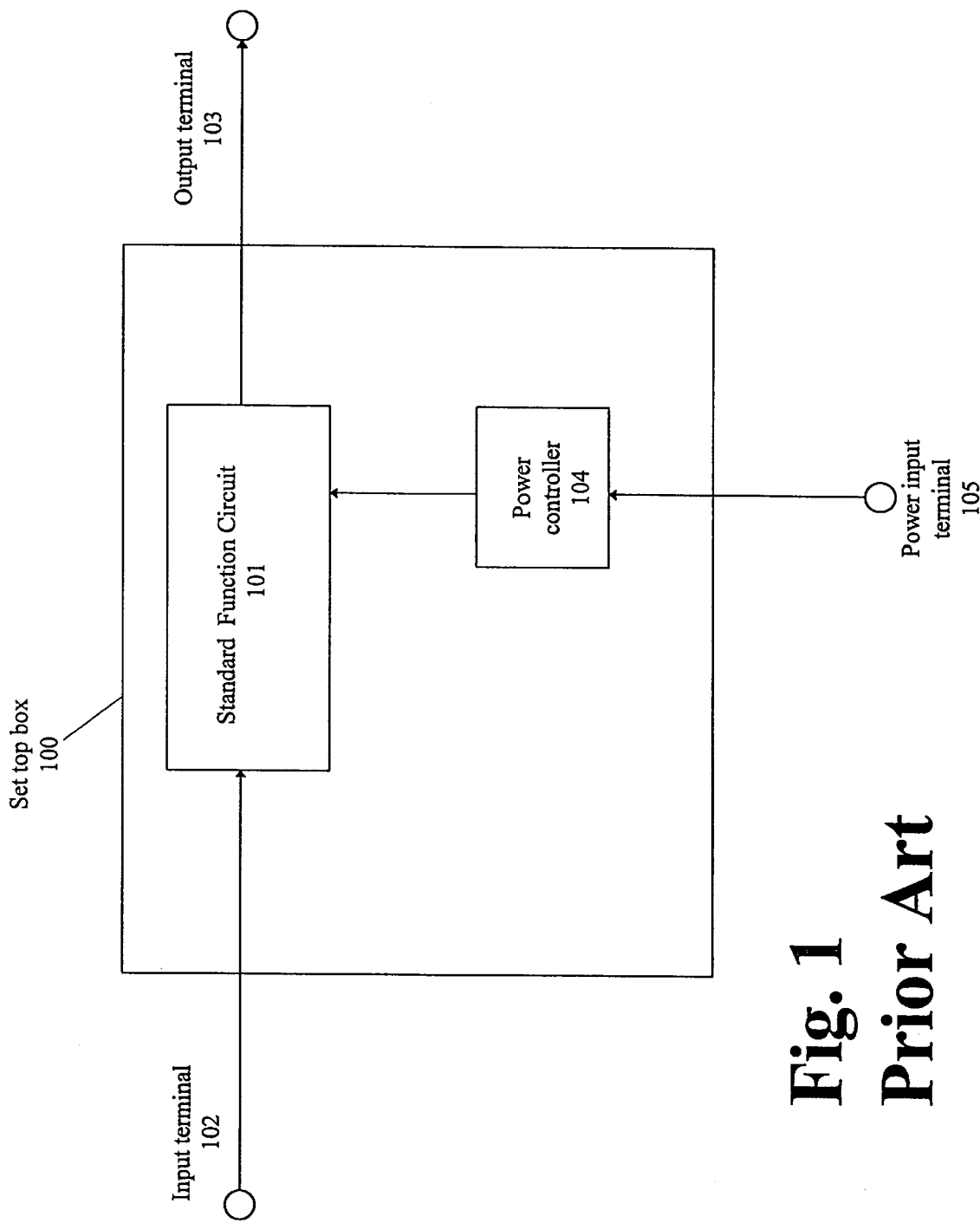
FIG. 1 is a block diagram of a conventional set top box.
Figure 2:
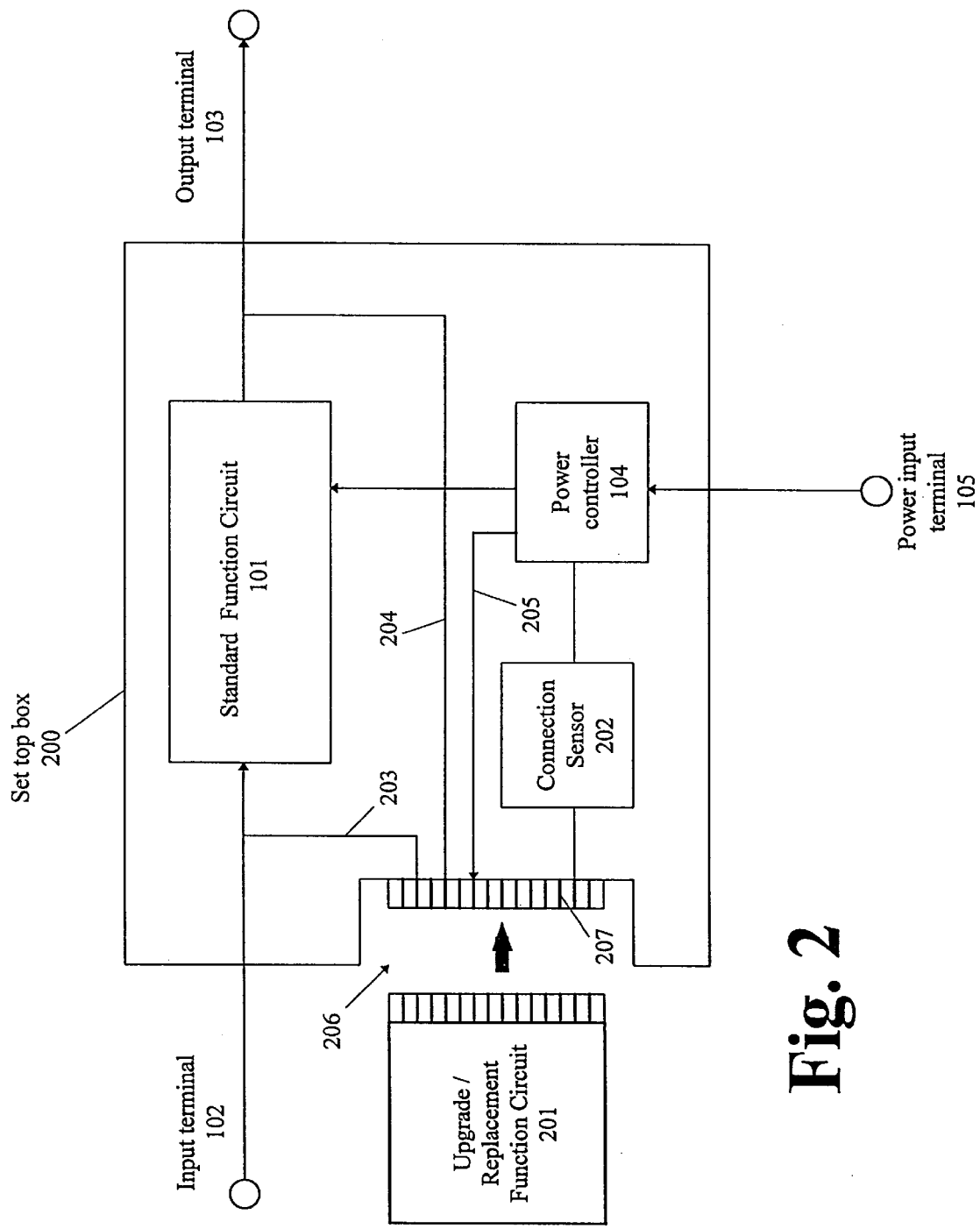
FIG. 2 is a block diagram of a first embodiment of the present invention incorporated into set top box.

As shown in FIG. 2, a set top box 200 of the present invention includes an audiovisual signal input terminal 102 which allows an input signal to be delivered to the standard function circuit 101. As in the device shown in FIG. 1, the standard function circuit 101 performs a function on the input signal, e.g. decodes or otherwise enhances the signal, and outputs the processed signal to a receiver device through output terminal 103.

Power is provided through power input terminal 105 to a power controller 104. Under normal operating conditions, the power controller 104 provides power from terminal 105 to the standard function circuit 101 to power that circuit.

The set top box 200 of the present invention also includes a port 206. Disposed in the port 206 is a connector 207, e.g. pin receiving holes, for connecting an external function circuit module 201 to the circuitry of the set top box 200. The upgrade/replacement function circuit module 201 is a self-contained function circuit that replaces, and likely improves upon, the standard function circuit 101. The function circuit module 201 will be provided with a connector, e.g. pins, for connecting the improved function circuit onboard the module 201 to the circuitry of the set top box 200 through the connector 207 in the port 206.

The set top box 200 includes a connection sensor 202 that determines when an upgraded function circuit module 201 has been connected in the port 206. The connection sensor 202 may be a wide variety of equivalent devices for detecting the presence of the circuit module 201. For example, the connection sensor 202 may incorporate a switch which is actuated by a user when the user inserts the model 201 in the port 206. Similarly, the connection sensor 202 may incorporate a switch which is actuated by the act of connecting the module 201 to the port 206. The connection sensor 202 may alternatively incorporate an optical sensor which, due the reflection of a light by the inserted module 201 or the occlusion of a light beam by the inserted module 201, registers the presence of the function circuit module 201 in the port 206. Many other equivalent methods and means for detecting the function circuit module in the port 206 will be apparent to those skilled in the art and are considered within the scope of the present invention.

When the connection sensor 202 registers the presence of the function circuit module 201 in the port 206, the connection sensor 202 signals the power controller 104. In response, the power controller 104 ceases to provide power to the standard function circuit 101. Instead, the power controller 104 provides power over line 205 to the port 206 and, ultimately, to the function circuit onboard the function circuit module 201.

The input audiovisual signal is also provided via line 203 to the port 206 and, ultimately, to the upgraded or replacement function circuit 201. Through the connector 207, via line 204, the upgraded function circuit 201 can output a processed audiovisual signal to the output terminal 103 and, ultimately, to a receiver (not shown).

In this way, the standard function circuit 101 which has become obsolete or has malfunctioned is completely bypassed and replaced by the upgraded or replacement function circuit 201. As will be readily apparent, the present invention allows a set top box to be readily and less expensively upgraded by simply providing the authorized subscriber with an upgraded function circuit module 201 that can be plugged into the port 206.

Figure 3:
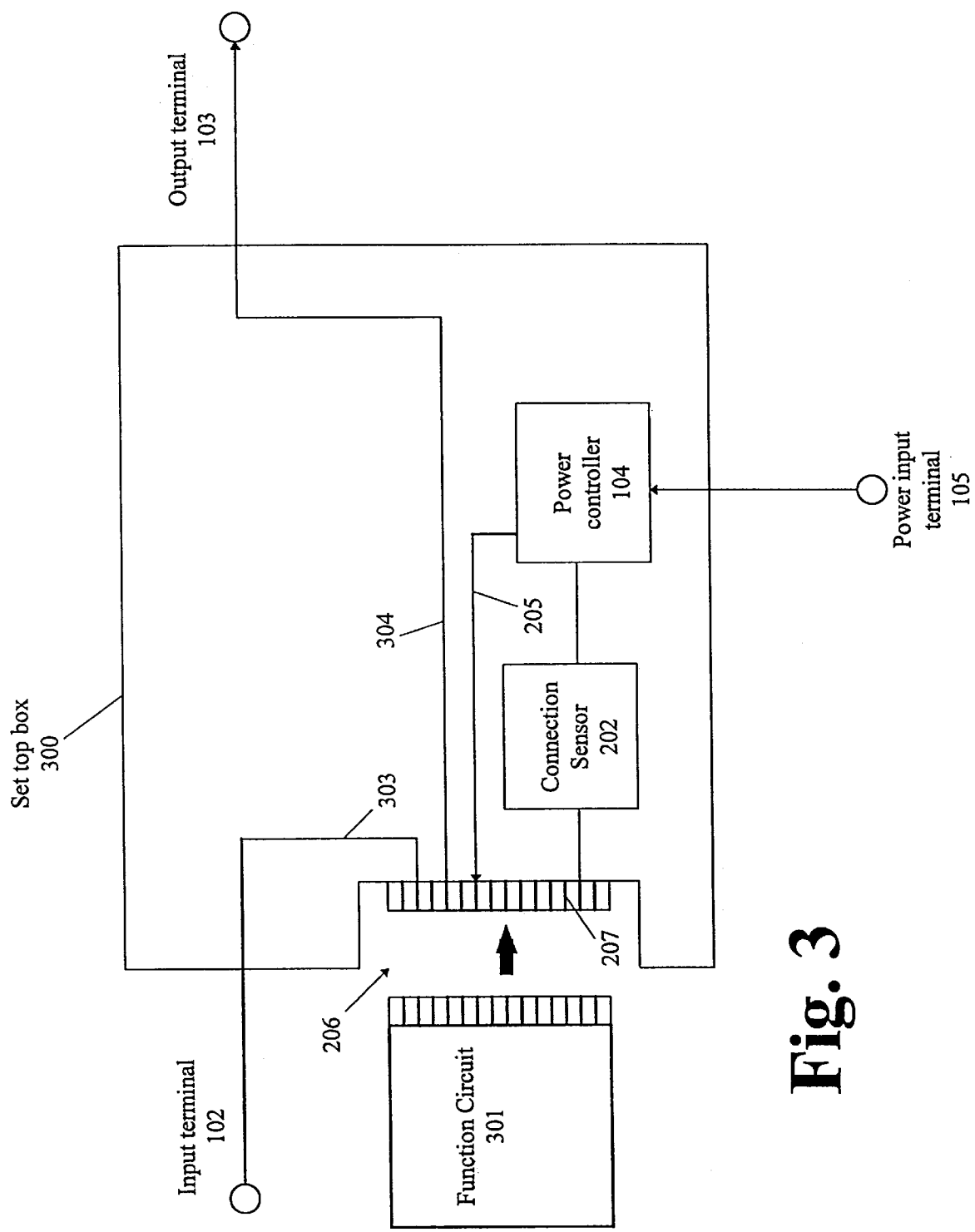
FIG. 3 is a block diagram of a second embodiment of the present invention in a set top box.

FIG. 3 illustrates a second embodiment of the present invention which is similar in many respects. However, the embodiment of the present invention includes a set top box 300 in which no standard function circuit is provided. This decreases the cost of manufacturing the set top box initially.

Instead of permitting the user to bypass an existing standard function circuit as in FIG. 2, the set top box 300 of FIG. 3 makes exclusive use of a function circuit provided in a module 301. The input audiovisual signal is provided, via line 303, from the input terminal 102 to the port 206 and, ultimately, to the function circuit 301. A output signal, which has been processed by the function circuit 301, is output via line 304 to the output terminal 103.

The embodiment shown in FIG. 3 may include the connection sensor 202 described above in order to prevent the power controller 104 from needlessly providing power to the port 206 when no function circuit module 301 is inserted.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An upgradeable set top box comprising:

an input terminal for receiving an audiovisual signal;

an output terminal; and a port having a connector for receiving a function circuit module therein and connecting a function circuit of said module between said input terminal and said output terminal, wherein said function circuit receives said audiovisual signal from said input terminal, processes said audiovisual signal and outputs a processed audiovisual signal; and further wherein internal function circuitry of said set-top terminal is deactivated or bypassed when said function circuit module is present in said port.

2. A set top box as claimed in claim 1, wherein said processed audiovisual signal is a decoded audiovisual signal.

3. A set top box as claimed in claim 1, wherein said processed audiovisual signal is an enhanced audiovisual signal.

4. An upgradeable set top box comprising:

an input terminal for receiving an audiovisual signal;

an output terminal; and a port having a connector for receiving a function circuit module therein and connecting a function circuit of said module between said input terminal and said output terminal; and a connection sensor for detecting whether a function circuit module is present in said port;

wherein said function circuit receives said audiovisual signal from said input terminal and outputs a processed audiovisual signal.

5. A set top box as claimed in claim 4, further comprising a power controller for selectively providing power to a function circuit module present in said port as determined by said connection sensor.

6. A set top box as claimed in claim 5, wherein said power controller ceases to provide power to a standard function circuit disposed in said set top box when a function circuit module is present in said port as determined by said connection sensor.

7. An upgradeable set top box comprising:

an input terminal for receiving an audiovisual signal;

an output terminal; and a port having a connector for receiving a function circuit module therein and connecting a function circuit of said module between said input terminal and said output terminal;

wherein said function circuit receives said audiovisual signal from said input terminal and outputs a processed audiovisual signal; and wherein said function circuit module is a self-contained function circuit module comprising said function circuit for receiving an audiovisual signal and a connector for connecting said function circuit to said port of said set top box, said connector having connections for providing power and said audiovisual signal to said function circuit, and for outputting a processed audiovisual signal from said function circuit when said module is connected to said set top box, wherein internal function circuitry of said set-top terminal is deactivated when said function circuit module is present in said port.

8. A method of upgrading or replacing a function circuit of a set top box comprising connecting a self-contained module having a function circuit therein to a first port of said set top box so that said function circuit receives an input audiovisual signal through said first port and outputs a processed audiovisual signal through a second port, further comprising bypassing a standard function circuit disposed in said set top box after said connecting is performed.

9. A method as claimed in claim 8, further comprising decoding said input audiovisual signal with said function circuit to generate said processed audiovisual signal.

10. A method as claimed in claim 8, further comprising enhancing said input audiovisual signal with said function circuit to generate said processed audiovisual signal.

11. A method of upgrading or replacing a function circuit of a set top box comprising connecting a self-contained module having a function circuit therein to a first port of said set top box so that said function circuit receives an input audiovisual signal through said first port and outputs a processed audiovisual signal through a second port, wherein said first port and said second port are the same and said bypassing comprises cutting power to said standard function circuit.

12. A method as claimed in claim 11, further comprising detecting connection of said module in said port and initiating said bypassing is response to said detecting.

13. A method as claimed in claim 11, further comprising actuating a switch in performing said connecting to initiate said bypassing.

* * * * *